(12) United States Patent
Chen et al.

(10) Patent No.: US 12,276,866 B2
(45) Date of Patent: Apr. 15, 2025

(54) OPTICAL IMAGING LENS AND IMAGING DEVICE

(71) Applicant: JIANGXI LIANCHUANG ELECTRONIC CO., LTD, Jiangxi (CN)

(72) Inventors: Weijian Chen, Jiangxi (CN); Xuming Liu, Jiangxi (CN); Jiyong Zeng, Jiangxi (CN)

(73) Assignee: JIANGXI LIANCHUANG ELECTRONIC CO., LTD, Jiangxi (CN)

( * ) Notice: Subject to any disclaimer, the term of this patent is extended or adjusted under 35 U.S.C. 154(b) by 573 days.

(21) Appl. No.: 17/749,845

(22) Filed: May 20, 2022

(65) Prior Publication Data

US 2022/0276466 A1 Sep. 1, 2022

Related U.S. Application Data

(63) Continuation-in-part of application No. PCT/CN2020/129443, filed on Nov. 17, 2020.

(30) Foreign Application Priority Data

Nov. 20, 2019 (CN) .......................... 201911137973.9

(51) Int. Cl.
G02B 9/64 (2006.01)
G02B 13/00 (2006.01)
G02B 13/16 (2006.01)

(52) U.S. Cl.
CPC ........... *G02B 9/64* (2013.01); *G02B 13/0045* (2013.01); *G02B 13/006* (2013.01); *G02B 13/16* (2013.01)

(58) Field of Classification Search
CPC ............................... G02B 13/0045; G02B 9/64
See application file for complete search history.

(56) References Cited

U.S. PATENT DOCUMENTS

| 5,745,297 A | 4/1998 | Kaneko et al. |
| 10,830,994 B2 | 11/2020 | Nakai et al. |

(Continued)

FOREIGN PATENT DOCUMENTS

| CN | 104808315 A | 7/2015 |
| CN | 105353500 A | 2/2016 |

(Continued)

OTHER PUBLICATIONS

International Search Report and Written Opinion in Application No. PCT/CN2020/129443, mailed on Feb. 20, 2021, 12 pages.

(Continued)

*Primary Examiner* — Alexander P Gross
(74) *Attorney, Agent, or Firm* — Meunier Carlin & Curfman LLC (57) ABSTRACT

An optical imaging lens and an imaging equipment comprising: a first, second, and seventh lens each with focal power and a convex surface on an object side and a concave surface on an image side; a third lens, fourth, and fifth lens each with positive focal power and having a convex surface on the object side and a convex surface on the image side; a sixth lens with negative focal power, having an object side surface being a concave surface and an image side surface being a concave surface; and a diaphragm. The optical imaging lens has the characteristics of super large aperture, long focal length, and high resolution, and can meet the requirements of small field of view and high resolution, e.g., in vehicle-mounted devices.

20 Claims, 9 Drawing Sheets

(56) References Cited

U.S. PATENT DOCUMENTS

2013/0265649 A1  10/2013  Ohashi
2018/0275379 A1   9/2018  Cheng et al.
2020/0363609 A1  11/2020  Bao et al.
2021/0096328 A1*  4/2021  Wang .................. G02B 13/004

FOREIGN PATENT DOCUMENTS

| CN | 106772951 A | 5/2017 |
| CN | 108469667 A | 8/2018 |
| CN | 208969321 U | 6/2019 |
| CN | 110095854 A | 8/2019 |
| CN | 110632743 A | 12/2019 |

OTHER PUBLICATIONS

Office Action in Chinese Application No. 201911137973.9, mailed on Jan. 9, 2020, 1 page.

* cited by examiner

OPTICAL IMAGING LENS AND IMAGING DEVICE

RELATED APPLICATION

This application claims priority to, and the benefit of PCT Application PCT/CN2020/129443, filed Nov. 17, 2020, and Chinese Patent Application No. 201911137973.9, filed Nov. 20, 2019, each of which is incorporated by reference herein in its entirety.

TECHNICAL FIELD

The present invention relates to the technical field of lens imaging, and particularly relates to an optical imaging lens and an imaging equipment.

BACKGROUND ART

Advanced Driving Assistant System (ADAS) is an active safety technology that uses various sensors installed on a vehicle to immediately collect environmental data inside and outside the vehicle, and carry out technical processing such as static and dynamic object identification, detection and tracking, so as to enable the driver to be aware of potential hazards in the shortest possible time to attract attention and improve safety. An on-board camera is the main visual sensor of the ADAS system. After an image is collected by a lens, the photosensitive component circuit and control component in the camera process the image and convert it into a digital signal that can be processed by computer, so as to sense the road conditions around the vehicle and fulfil ADAS functions such as forward collision warning, lane offset alarm and pedestrian detection.

As the progress in the technologies related to ADAS has brought about the commercialization and popularization, the need for an on-board camera is becoming increasingly diversified. At present, chips with large target surface and high pixel of 8 M (MegaPixel) applied in the on-board field have become popular in the market, but there are still few cameras that can be matched with them, especially the on-board lens having large aperture and long focus.

SUMMARY OF THE INVENTION

For this purpose, the objective of the invention lies in providing an optical imaging lens and imaging equipment having long focal length, high resolution and small distortion and other characteristics.

According to the embodiments of the invention, the aforesaid objective is accomplished by the following technical solutions.

In the first aspect, the invention provides an optical imaging lens, sequentially comprising, from an object side to an image side, a first lens with focal power, having an object side surface being a convex surface and an image side surface being a concave surface; a second lens with negative focal power, having an object side surface being a concave surface and an image side surface being a concave surface; a third lens with positive focal power, having an object side surface being a convex surface and an image side surface being a convex surface; a fourth lens with positive focal power, having an object side surface being a convex surface and an image side surface being a convex surface; a fifth lens with positive focal power, having an object side surface being a convex surface and an image side surface being a convex surface; a sixth lens with negative focal power, having an object side surface being a concave surface and an image side surface being a concave surface, and the fifth lens and the sixth lens formed into a cemented body; a seventh lens with negative focal power, having an object side surface being a convex surface and an image side surface being a concave surface; and a diaphragm disposed between the first lens and the third lens; wherein the first lens, the second lens, the third lens, the fourth lens, the fifth lens, the sixth lens and the seventh lens are glass lenses.

In the second aspect, the invention provides imaging equipment, comprising an optical imaging lens provided in the first aspect and an imaging device for converting an optical image formed by the infrared optical imaging lens into electrical information.

Compared with the prior art, the optical imaging lens provided by the invention have the characteristics such as long focal length, high resolution and small distortion, in particular the characteristics of super large aperture and excellent imaging effect. At present, the aperture of an on-board optical lens in the market is generally in the range of 1.8~2.0, while that of the optical imaging lens provided by the invention is equal to or less than 1.2 with the luminous flux increased by 2~4 times, thereby significantly enhancing the luminous flux of the lens, so that the lens can also have good imaging effect in dark environment.

The first lens of the optical imaging lens provided by the invention is mainly used to control an incident angle of light. The second lens and the third lens, as well as the fifth lens and the sixth lens, are configured in an optical structure of adjacent biconcave and biconvex lenses, and this combination of concave-convex lenses can not only offset various kinds of aberrations generated by the lenses, but also improve the tolerance sensitivity of the lens as a whole. Generally, the allowable focal depth of a large-aperture camera is very small, and the tolerance sensitivity directly determines the productivity of the product, so its mass production can be improved by means of promoting the overall tolerance sensitivity of the lens. The seventh lens employs an aspherical lens, which effectively corrects the field curvature and astigmatism of the optical system and improves the resolution of the lens.

BRIEF DESCRIPTION OF THE DRAWINGS

The above and/or additional aspects and advantages of the invention will become apparent and easy to understand from the description of the embodiments with reference to the following drawings, among which.

The invention will be further described in the Detailed Description of the Embodiments of the Invention below with reference to the drawings listed above.

DETAILED DESCRIPTION OF THE EMBODIMENTS OF THE INVENTION

In order to make the objective, features and advantages of the invention more obvious and easier to understand, the specific embodiments of the invention will be described in detail below with reference to the drawings. Several embodiments of the invention are illustrated in the drawings. However, the invention may be implemented in many different forms, not limited to the embodiments as described herein. On the contrary, these embodiments are provided in order to make the disclosure of the invention more thorough and comprehensive.

The invention provides an optical imaging lens, sequentially comprising, from an object side to an image side, a first lens, a diaphragm, a second lens, a third lens, a fourth lens, a fifth lens, a sixth lens, a seventh lens and an optical filter. The first lens with focal power has an object side surface being a convex surface and an image side surface being a concave surface; the second lens with negative focal power has an object side surface and an image side surface, both of which are concave surfaces; the third lens with positive focal power has an object side surface and an image side surface, both of which are convex surfaces; the fourth lens with positive focal power has an object side surface and an image side surface, both of which are convex surfaces; the fifth lens with positive focal power has an object side surface and an image side surface, both of which are convex surfaces; the sixth lens with negative focal power has an object side surface and an image side surface, both of which are concave surfaces, and the fifth lens and the sixth lens are formed into a cemented body; the seventh lens with negative focal power has an object side surface being a convex surface and an image side surface being a concave surface; the diaphragm is disposed between the first lens and the second lens, or between the second lens and the third lens; and the first lens, the second lens, the third lens, the fourth lens, the fifth lens, the sixth lens and the seventh lens are glass lenses. The fifth lens and the sixth lens are cemented to facilitate assembly and reduce the volume of the lens.

The first lens is mainly used to control an incident angle of light. The second lens and the third lens, as well as the fifth lens and the sixth lens, are configured in an optical structure of adjacent biconcave and biconvex lenses, and this combination of concave-convex lenses can not only offset various kinds of aberrations generated by the lenses, but also improve the tolerance sensitivity of the lens as a whole. Generally, the allowable focal depth of a large-aperture camera is very small, and the tolerance sensitivity directly determines the productivity of the product, so its productivity can be improved by means of promoting the overall tolerance sensitivity of the lens. The seventh lens employs an aspherical lens, which effectively corrects the field curvature and astigmatism of the optical system and improves the resolution of the lens.

Each lens in the optical imaging lens provided by the invention is a glass lens. Compared with other optical materials, the glass material has better chemical stability and longer service life, and can be used in harsh environment.

In some embodiments, the second lens and the third lens are formed into a cemented body, which reduces the aberration of the lens and effectively shortens the total length of the lens system.

In some embodiments, the second lens, the third lens, the fifth lens and the sixth lens are spherical lenses, and the fourth lens and the seventh lens are aspherical lenses. Through a reasonable collocation of multiple glass spherical and aspheric lenses and a reasonable collocation of focal powers, the resolution of the lens is greatly improved, so that it can match an imaging chip having 8 M pixel specification and large target surface to meet the urgent needs of the market for an on-board high-pixel lens. The seventh lens is an aspherical lens, which effectively corrects the field curvature and astigmatism of the optical system and improves the resolution of the lens.

In some embodiments, the optical imaging lens provided by the invention satisfies a condition as below:

$$F\#/f<0.1; \quad (1)$$

where F# represents an aperture value of the optical imaging lens, and f represents a focal length of the optical imaging lens. The aperture value is a ratio of the focal length of the lens to a light transmission diameter of the lens. If the condition (1) is satisfied, this reflects that the lens has the characteristics of large aperture and long focal length.

In some embodiments, the optical imaging lens provided by the invention satisfies a condition as below:

$$0.99<(f*\tan\theta)/Y_\theta<1.01; \quad (2)$$

where f represents a focal length of the optical imaging lens, θ represents an angle of half field of view of the optical imaging lens, $Y_\theta$ represents an image height value corresponding to the angle of half field of view of the optical imaging lens. If the condition (2) is satisfied, this reflects that the lens has the characteristic of very small distortion.

In some embodiments, the optical imaging lens provided by the invention satisfies a condition as below:

$$TTL/f<4; \quad (3)$$

where TTL represents a total optical length of the optical imaging lens, and f represents a focal length of the optical imaging lens. In general, the longer the focal length, the longer the total optical length of the lens. If the condition (3) is satisfied, this can effectively limit the length of the lens while ensuring that the lens has long focal length.

In some embodiments, the optical imaging lens provided by the invention satisfies a condition as below:

$$20° < FOV < 40°; \quad (4)$$

where FOV represents the maximum angle of field of view of the optical imaging lens. If the condition (4) is satisfied, this shows that the range of the field of view of the lens on the object side is small, which is conducive to improving the imaging effect of the lens for long-distance imaging of an object.

In some embodiments, the optical imaging lens provided by the invention satisfies conditions as below:

$$0.3 < f/f1 < 0.3; \quad (5)$$

$$0.5 < R12/R11 < 1.5; \quad (6)$$

where R11 represents a radius of curvature of the object side surface of the first lens, R12 represents a radius of curvature of the image side surface of the first lens, f represents a focal length of the optical imaging lens, and f1 represents a focal length of the first lens. The conditions (5) and (6) are reasonable limits on the shape and focal power of the first lens. If the above conditions (5) and (6) are met, this can ensure that an incident light beam does not deflect significantly when passing through the first lens, which helps the lens to achieve the characteristic of super large aperture.

In some embodiments, the optical imaging lens provided in the invention satisfies conditions as below:

$$-2 < f2/f3 < -0.5; \quad (7)$$

$$-2 < f5/f6 < -0.5; \quad (8)$$

where f2 represents a focal length of the second lens, f3 represents a focal length of the third lens, f5 represents a focal length of the fifth lens, and f6 represents a focal length of the sixth lens. The second lens and the third lens, as well as the fifth lens and the sixth lens, are configured in an optical structure of adjacent biconcave and biconvex lenses. If the conditions (7) and (8) are satisfied, the combination and collocation of the adjacent lenses with positive and negative focal lengths can not only offset various kinds of aberrations generated by the lenses, but also improve the tolerance sensitivity of the lens as a whole and increase the product yield.

In some embodiments, the optical imaging lens provided by the invention satisfies a condition as below:

$$1 < f4/f < 3; \quad (9)$$

where f4 represents a focal length of the fourth lens, and f represents a focal length of the optical imaging lens. If the condition (9) is satisfied, this can contribute positive spherical aberration to the imaging system, which is conducive to reducing the overall spherical aberration of the imaging system, achieving the optical convergence, and further narrowing the optical aperture of the lens.

In some embodiments, the optical imaging lens provided by the invention satisfies conditions as below:

$$-0.6 < f/f7 < 0; \quad (10)$$

$$0.5 < R72/R71 < 1; \quad (11)$$

where R71 represents a radius of curvature of the object side surface of the seventh lens, R72 represents a radius of curvature of the image side surface of the seventh lens, f represents a focal length of the optical imaging lens, and f7 represents a focal length of the seventh lens. If the conditions (10) and (11) are satisfied, this can effectively correct the field curvature and astigmatism of the imaging system and improve the resolution of the lens.

In some embodiments, the optical imaging lens provided by the invention satisfies a condition as below:

$$Nd1 > 1.8, Nd7 > 1.8; \quad (12)$$

where Nd1 represents a refractive index of the first lens, and Nd7 represents a refractive index of the seventh lens. If the condition (12) is satisfied, this is conducive to limiting the length of the optical imaging lens.

In some embodiments, the aperture value of the optical imaging lens provided by the invention satisfies f# ≤ 1.2. At present, the aperture of an on-board optical lens in the market is generally more than 1.8. As the aperture of the optical imaging lens provided by the invention is equal to or less than 1.2, the luminous flux is increased by 2-4 times, which can achieve good imaging quality in bright and dark environments and adapt to the working environment of luminance change in the on-board field.

In some embodiments, the invention provides an imaging equipment, comprising an optical imaging lens as described above and an imaging device for converting an optical image formed by the optical imaging lens into an electrical signal.

The surface shape of each aspherical lens in each embodiment of the invention satisfies the following equation:

$$z = \frac{ch^2}{1 + \sqrt{1 - (1+K)c^2h^2}} + Bh^4 + Ch^6 + Dh^8 + Eh^{10} + Fh^{12};$$

where z represents a distance of a curve surface from the curve surface vertex in the direction of the optical axis, h represents a distance from the optical axis to the curve surface, c represents a curvature of the surface vertex, K represents a quadric surface coefficient, and B, C, D, E and F represent fourth-order, sixth-order, eighth-order, tenth-order and twelfth-order surface coefficients, respectively.

In the following embodiments, the lenses in the optical imaging lens are different in thickness, radius of curvature, and field of view, image height. For specific differences, reference may be made to the parameter tables of each embodiment.

First Embodiment

Figure 1:
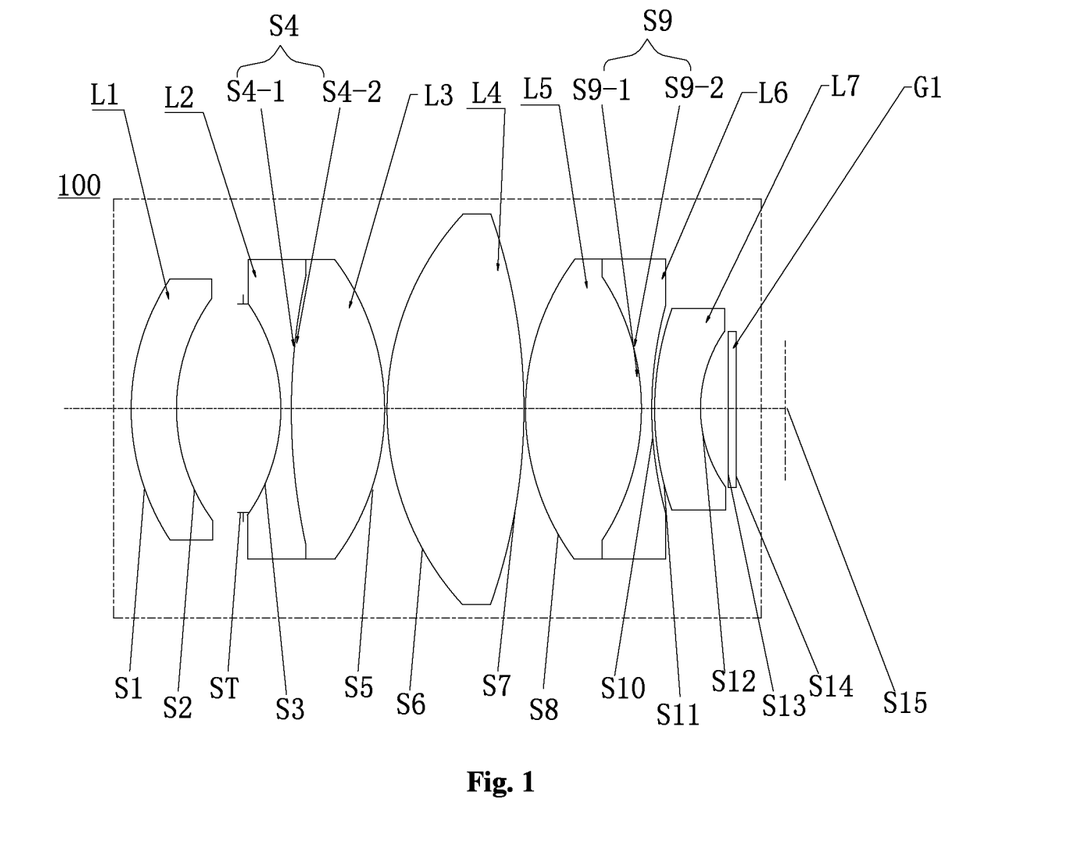
FIG. 1 illustrates a schematic diagram of a structure of an optical imaging lens in a first embodiment of the invention.

Referring to FIG. 1, an optical imaging lens 100 provided in this embodiment sequentially comprises, from an object side to an image side, a first lens L1, a diaphragm ST, a second lens L2, a third lens L3, a fourth lens L4, a fifth lens L5, a sixth lens L6, a seventh lens L7, and an optical filter G1.

The first lens L1 has negative focal power, an object side surface S1 thereof being a convex surface and an image side surface S2 thereof being a concave surface, and the first lens L1 is a glass aspherical lens;

The second lens L2 has negative focal power, both an object side surface S3 and an image side surface S4-1 thereof being concave surfaces;

The third lens L3 has positive focal power, both an object side surface S4-2 and an image side surface S5 thereof being convex surfaces, wherein the second lens L2 and the first lens L3 are formed into a cemented body and both are glass spherical lenses, that is, the image side surface S4-1 of the second lens is seamlessly bonded with the object side surface S4-2 of the third lens, and the cemented surface of the second lens L2 and the third lens L3 is S4;

The fourth lens L4 has positive focal power, both an object side surface S6 and an image side surface S7 thereof being convex surfaces, and the fourth lens L4 is a glass aspherical lens;

The fifth lens L5 has positive focal power, both an object side surface S8 and an image side surface S9-1 thereof being convex surfaces;

The sixth lens L6 has negative focal power, both an object side surface S9-2 and an image side surface S10 thereof being concave surfaces, wherein the fifth lens L5 and the sixth lens L6 are formed into a cemented body and both are glass spherical lenses, that is, the image side surface S9-1 of the fifth lens is seamlessly bonded with the object side surface S9-2 of the sixth lens, and the cemented surface of the fifth lens L5 and the sixth lens L6 is S9;

The seventh lens L7 has negative focal power, an object side surface S11 thereof being a convex surface and an image side surface S12 thereof being a concave surface, and the seventh lens L7 is a glass aspherical lens;

The diaphragm ST is disposed between the first lens L1 and the second lens L2; and the optical filter G1 is disposed between the seventh lens L7 and the imaging surface S15.

The relevant parameters of each lens of the optical imaging lens 100 provided in this embodiment are shown in Table 1.

TABLE 1

| Surf. No. | | Surf. Type | RoC (mm) | Thickness (mm) | Nd | Vd |
|---|---|---|---|---|---|---|
| | Object surface | plane | Infinity | Infinity | | |
| S1 | L1 | aspherical | 14.594 | 3.138 | 1.81 | 40.7 |
| S2 | | aspherical | 12.468 | 4.594 | | |
| ST | Diaphragm | plane | Infinity | 2.364 | | |
| S3 | L2 | spherical | −11.898 | 0.800 | 1.60 | 38 |
| S4 | L3 | spherical | 42.047 | 6.227 | 1.62 | 63.4 |
| S5 | | spherical | −16.151 | 0.200 | | |
| S6 | L4 | aspherical | 16.694 | 9.209 | 1.58 | 59.5 |
| S7 | | aspherical | −45.991 | 0.150 | | |
| S8 | L5 | spherical | 16.023 | 7.842 | 1.62 | 63.4 |
| S9 | L6 | spherical | −16.023 | 0.800 | 1.73 | 28.3 |
| S10 | | spherical | 25.529 | 0.160 | | |
| S11 | L7 | aspherical | 16.099 | 3.142 | 1.81 | 40.9 |
| S12 | | aspherical | 10.154 | 1.801 | | |
| S13 | G1 | plane | Infinity | 0.5 | 1.52 | 64.2 |
| S14 | | plane | Infinity | 3.397 | | |
| S15 | IS | plane | Infinity | | | |

Furthermore, the parameters of each aspherical lens in this embodiment are shown in Table 2.

TABLE 2

| Surf. No. | K | B | C | D | E | F |
|---|---|---|---|---|---|---|
| S1 | 1.296 | −4.92E−05 | −6.89E−07 | −7.87E−09 | 2.07E−10 | −2.66E−12 |
| S2 | 1.360 | −6.36E−05 | −4.89E−07 | −6.75E−08 | 1.85E−09 | −2.34E−11 |
| S6 | −0.153 | −8.19E−06 | 5.91E−08 | −1.85E−09 | 1.15E−11 | −3.38E−14 |
| S7 | 3.214 | −9.90E−06 | 1.59E−08 | −3.72E−10 | 4.30E−12 | −1.58E−14 |
| S11 | 3.586 | −0.00018 | −2.36E−06 | −6.74E−08 | 7.41E−10 | −9.57E−12 |
| S12 | −12.038 | 0.001693 | −5.93E−05 | 2.61E−06 | −6.99E−08 | 9.01E−10 |

Figure 2:
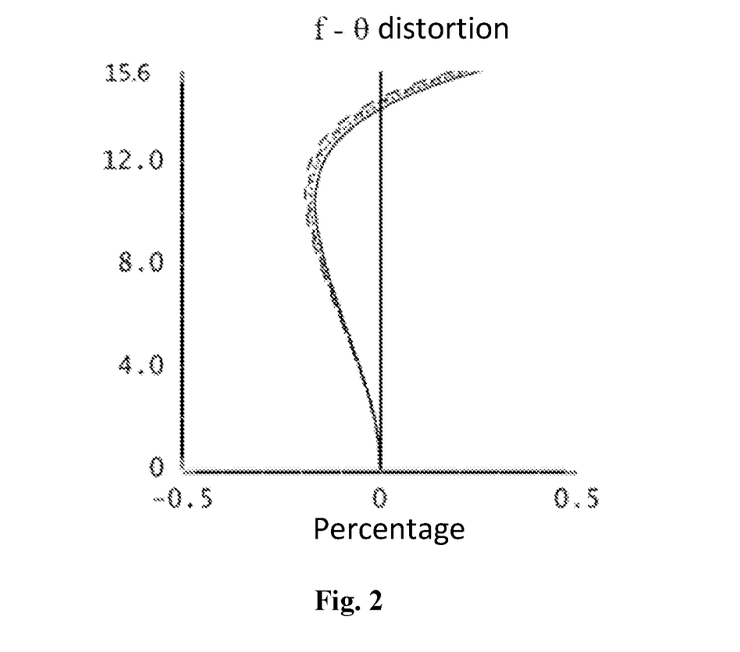
FIG. 2 illustrates a distortion curve diagram of the optical imaging lens in the first embodiment of the invention.
Figure 3:
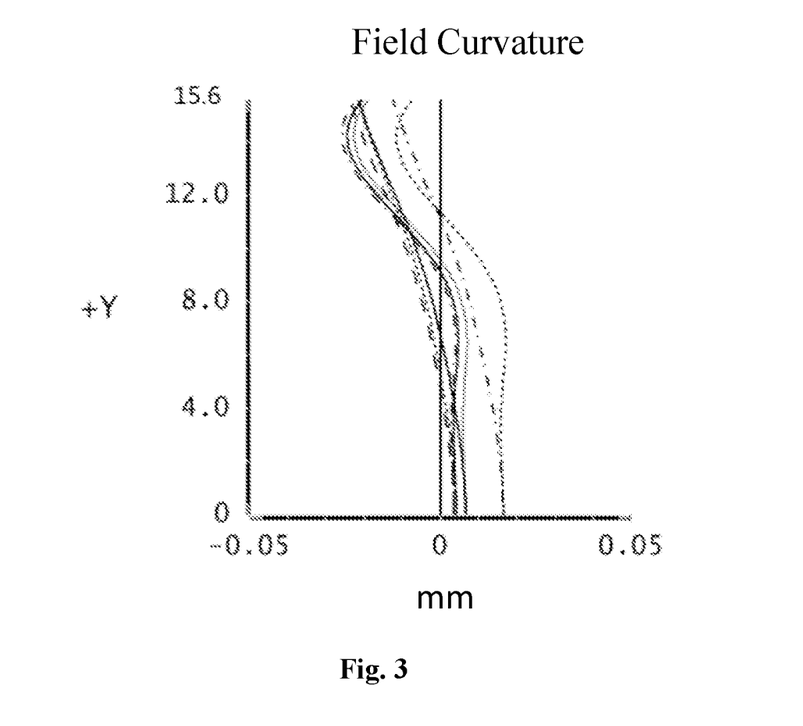
FIG. 3 illustrates a field curvature curve diagram of the optical imaging lens in the first embodiment of the invention.
Figure 4:
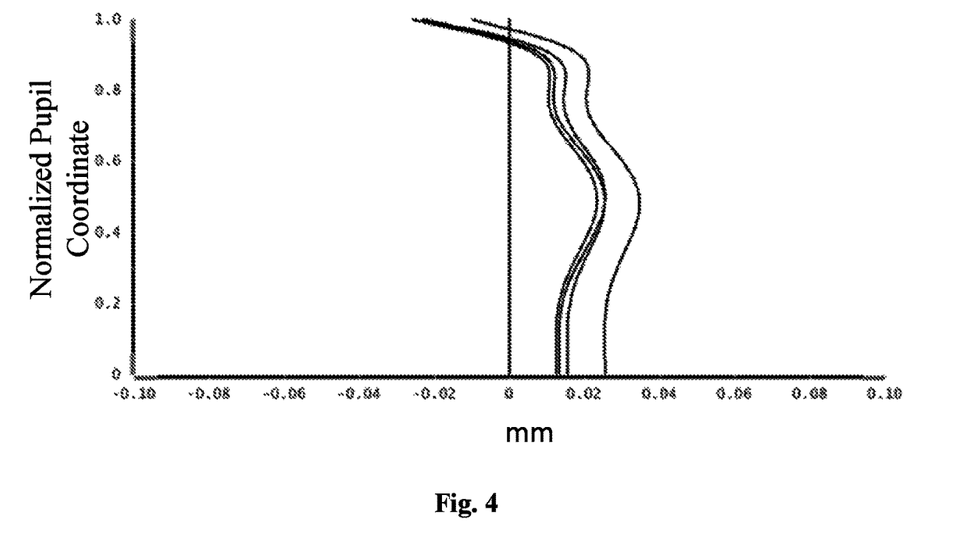
FIG. 4 illustrates an axial aberration diagram of the optical imaging lens in the first embodiment of the invention.

In this embodiment, a distortion, a field curvature, and an axial aberration curve thereof are shown in FIGS. 2, 3 and 4, respectively. As can be seen from FIGS. 2, 3 and 4, the distortion, the field curvature, and the axial aberration can be well corrected in this embodiment.

Second Embodiment

Figure 5:
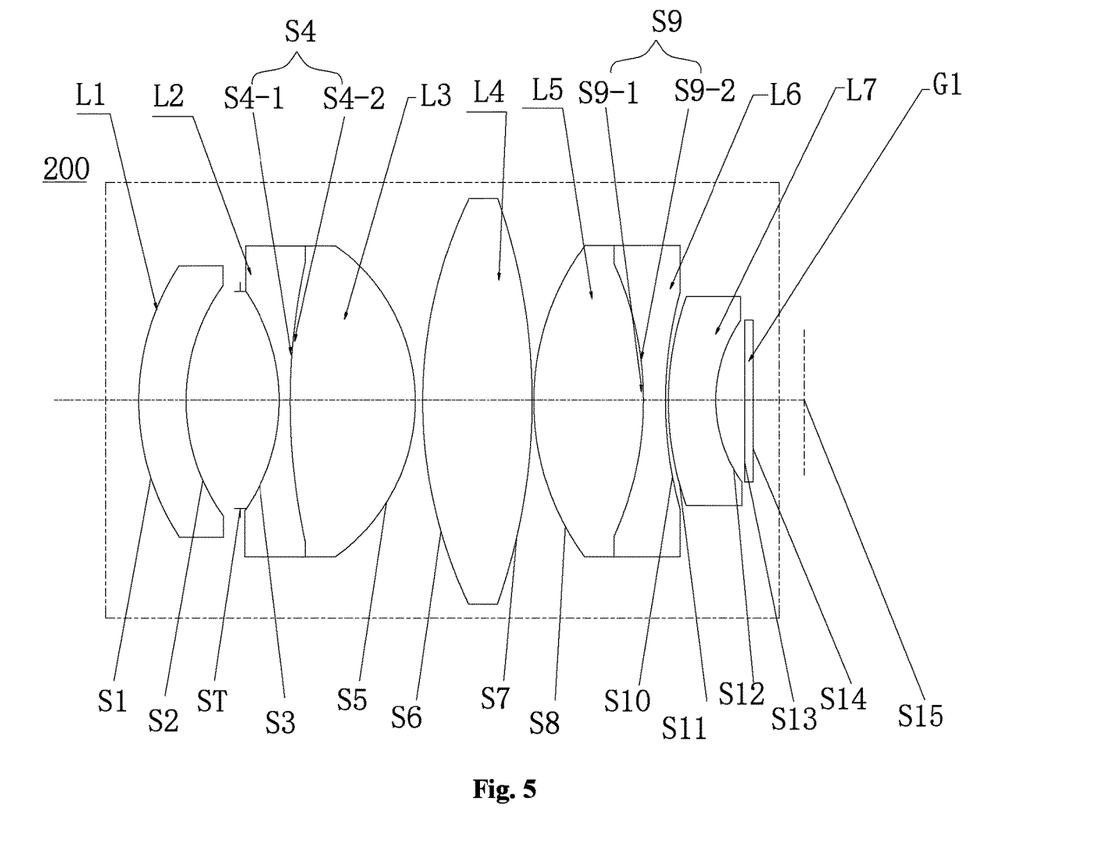
FIG. 5 illustrates a schematic diagram of a structure of an optical imaging lens in a second embodiment of the invention.

Referring to FIG. 5 for a schematic diagram of a structure of an optical imaging lens 200 provided in this embodiment, the optical imaging lens 200 in this embodiment is substantially the same as the optical imaging lens 100 in the first embodiment, and the differences therebetween lie in the first lens L1 having positive focal power, and the radius of curvature and selected material of the lens.

The relevant parameters of each lens of the optical imaging lens 200 provided in this embodiment are shown in Table 3.

TABLE 3

| Surf. No. | Surf. Type | RoC (mm) | Thickness (mm) | Nd | Vd |
|---|---|---|---|---|---|
| Object surface | plane | Infinity | Infinity | | |
| S1 | L1 aspherical | 18.279 | 3.486 | 1.81 | 40.7 |
| S2 | aspherical | 16.959 | 3.070 | | |
| ST | Diaphragm plane | Infinity | 1.968 | | |
| S3 | L2 spherical | −17.210 | 1.015 | 1.58 | 41.5 |
| S4 | L3 spherical | 18.223 | 9.519 | 1.62 | 63.4 |
| S5 | spherical | −17.454 | 0.223 | | |
| S6 | L4 aspherical | 34.239 | 7.064 | 1.58 | 59.5 |
| S7 | aspherical | −45.508 | 0.151 | | |
| S8 | L5 spherical | 16.103 | 6.621 | 1.69 | 54.6 |
| S9 | L6 spherical | −38.236 | 0.800 | 1.85 | 23.8 |
| S10 | spherical | 24.456 | 0.166 | | |
| S11 | L7 aspherical | 13.318 | 4.260 | 1.81 | 40.9 |
| S12 | aspherical | 8.674 | 2.034 | | |
| S13 | G1 plane | Infinity | 0.500 | 1.52 | 64.2 |
| S14 | plane | Infinity | 3.438 | | |
| S15 | IS plane | Infinity | | | |

Furthermore, the parameters of each aspherical lens in this embodiment are shown in Table 4.

TABLE 4

| Surf. No. | K | B | C | D | E | F |
|---|---|---|---|---|---|---|
| S1 | 2.083 | 8.15E−06 | −1.18E−07 | −1.1E−08 | 1.41E−10 | −1.48E−12 |
| S2 | −1.495 | 1.85E−04 | 6.13E−07 | −8.5E−09 | 3.77E−10 | −4.46E−12 |
| S6 | 1.053 | −8.30E−06 | −1.85E−07 | 6.83E−10 | −1.89E−12 | 1.24E−14 |
| S7 | 0.552 | −4.20E−05 | −4.39E−07 | 5.06E−09 | −2.45E−11 | 5.44E−14 |
| S11 | 0.025 | 1.14E−05 | −2.48E−06 | 7.47E−10 | 5.45E−10 | −6.12E−12 |
| S12 | 1.156 | 1.23E−04 | −9.11E−07 | −6.49E−07 | 3.35E−08 | −7.26E−10 |

Figure 6:
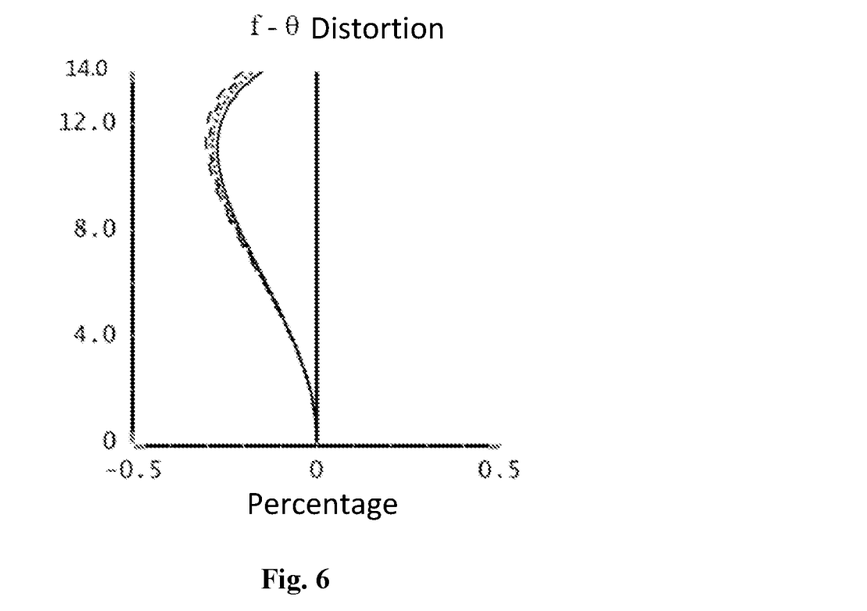
FIG. 6 illustrates a distortion curve diagram of the optical imaging lens in the second embodiment of the invention.
Figure 7:
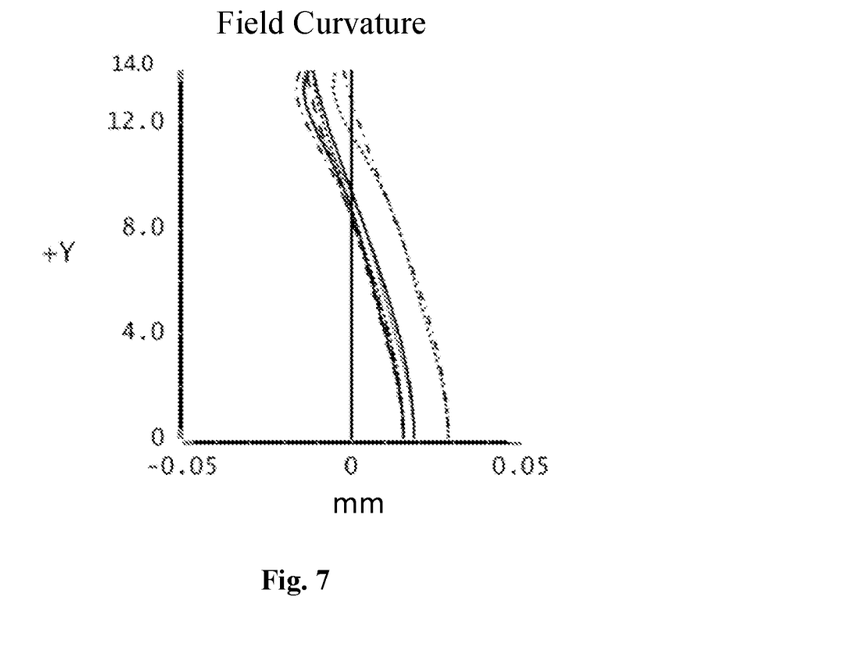
FIG. 7 illustrates a field curvature curve diagram of the optical imaging lens in the second embodiment of the invention.
Figure 8:
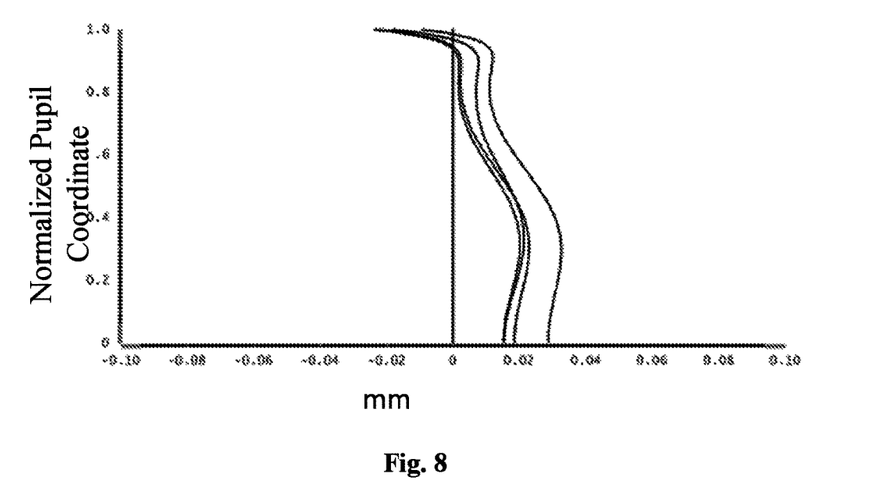
FIG. 8 illustrates an axial aberration diagram of the optical imaging lens in the second embodiment of the invention.

In this embodiment, a distortion, a field curvature, and an axial aberration curve thereof are shown in FIGS. 6, 7 and 8, respectively. As can be seen from FIGS. 6, 7 and 8, the distortion, the field curvature, and the axial aberration can be well corrected in this embodiment.

Third Embodiment

Figure 9:
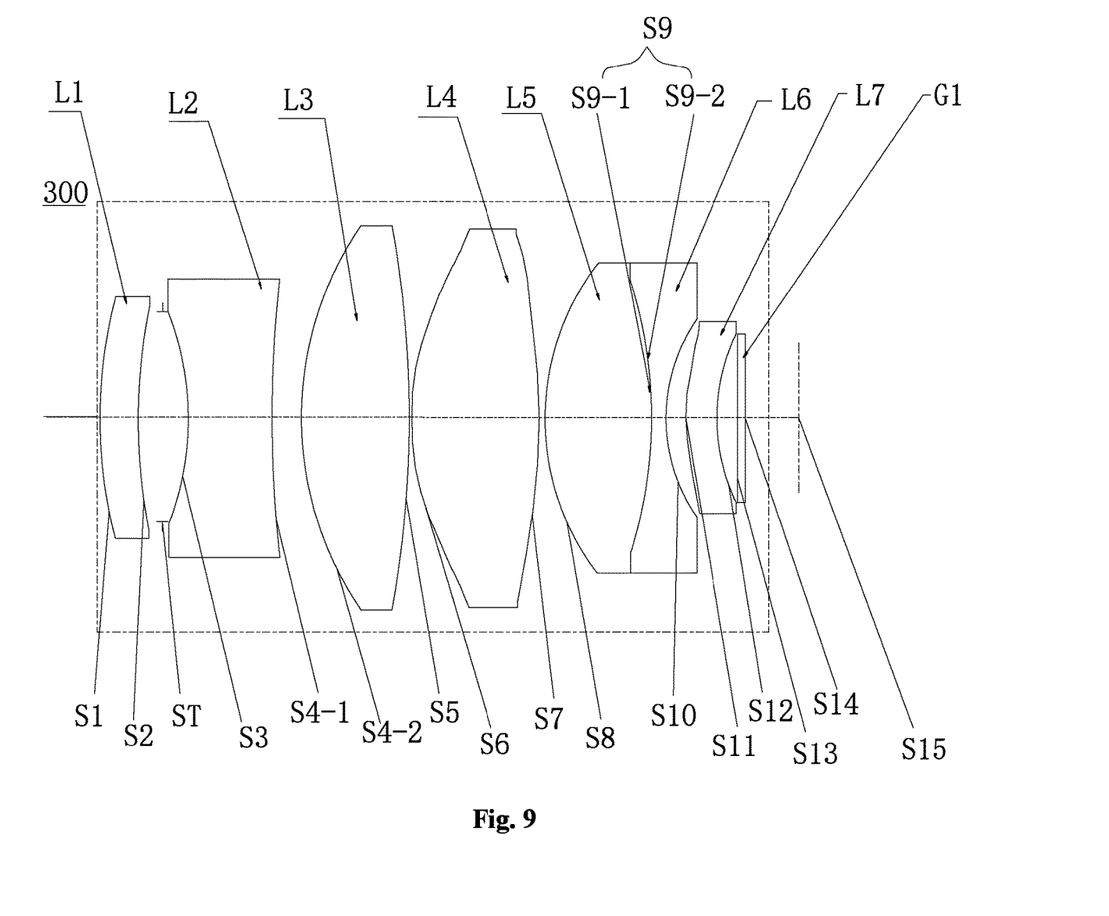
FIG. 9 illustrates a schematic diagram of a structure of an optical imaging lens in a third embodiment of the invention.

Referring to FIG. 9 for a schematic diagram of a structure of an optical imaging lens 300 provided in a third embodiment of the invention, the structure of the optical imaging lens 300 in this embodiment is substantially the same as that of the optical imaging lens 100 in the first embodiment, and the differences therebetween lie in the first lens L1 being a glass spherical lens having positive focal power, the second lens L2 and the third lens L3 being independent lenses (both not formed into a cemented body), and the radius of curvature and selected material of the lens.

The relevant parameters of each lens of the optical imaging lens 300 provided in this embodiment are shown in Table 5.

TABLE 5

| Surf. No. | | Surf. Type | RoC (mm) | Thickness (mm) | Nd | Vd |
|---|---|---|---|---|---|---|
| | Object Surface | plane | Infinity | Infinity | | |
| S1 | L1 | spherical | 26.477 | 2.454 | 1.81 | 40.9 |
| S2 | | spherical | 35.282 | 1.680 | | |
| ST | Diaphragm | plane | Infinity | 1.457 | | |
| S3 | L2 | spherical | −17.085 | 5.280 | 1.58 | 41.5 |
| S4-1 | | spherical | 67.525 | 1.926 | | |
| S4-2 | L3 | spherical | 20.076 | 6.677 | 1.50 | 81.6 |
| S5 | | spherical | −67.914 | 0.150 | | |
| S6 | L4 | aspherical | 16.033 | 8.000 | 1.50 | 81.6 |
| S7 | | aspherical | −39.913 | 0.502 | | |
| S8 | L5 | spherical | 15.318 | 6.493 | 1.9 | 37.1 |
| S9 | L6 | spherical | −29.892 | 1.038 | 1.85 | 23.8 |
| S10 | | spherical | 10.098 | 1.281 | | |
| S11 | L7 | aspherical | 13.465 | 1.932 | 1.82 | 24 |
| S12 | | aspherical | 11.027 | 1.307 | | |
| S13 | G1 | plane | Infinity | 0.500 | 1.52 | 64.2 |
| S14 | | plane | Infinity | 3.341 | | |
| S15 | IS | plane | Infinity | | | |

The parameters of each aspherical lens in this embodiment are shown in Table 6.

TABLE 6

| Surf. No. | K | B | C | D | E | F |
|---|---|---|---|---|---|---|
| S6 | −0.522 | −1.22E−05 | −4.53E−08 | −4.88E−10 | −7.78E−12 | 0 |
| S7 | −13.846 | 2.86E−05 | −2.36E−08 | −2.80E−09 | 9.12E−12 | 0 |
| S11 | 1.346 | −0.00029 | −5.77E−06 | −2.70E−07 | 7.91E−09 | −2.44E−11 |
| S12 | −0.856 | 9.16E−05 | −8.88E−06 | 1.94E−07 | −7.13E−09 | 3.42E−10 |

Figure 10:
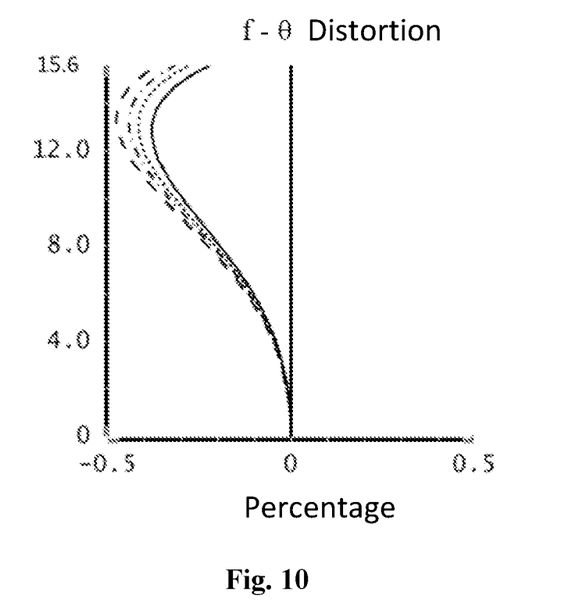
FIG. 10 illustrates a distortion curve diagram of the optical imaging lens in the third embodiment of the invention.
Figure 11:
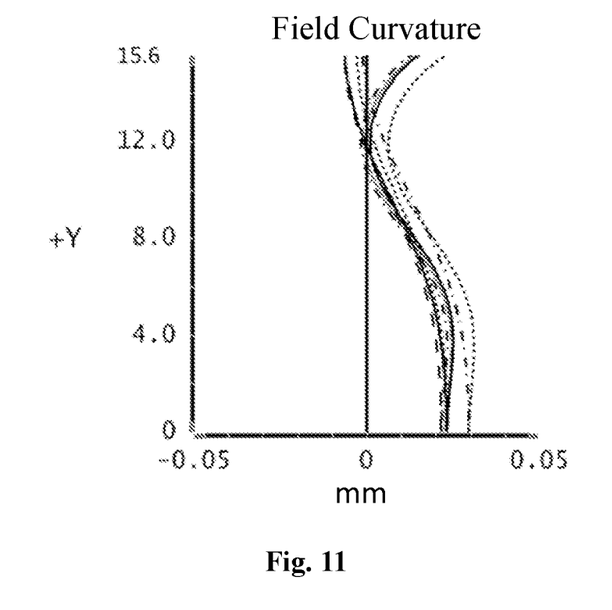
FIG. 11 illustrates a field curvature curve diagram of the optical imaging lens in the third embodiment of the invention.
Figure 12:
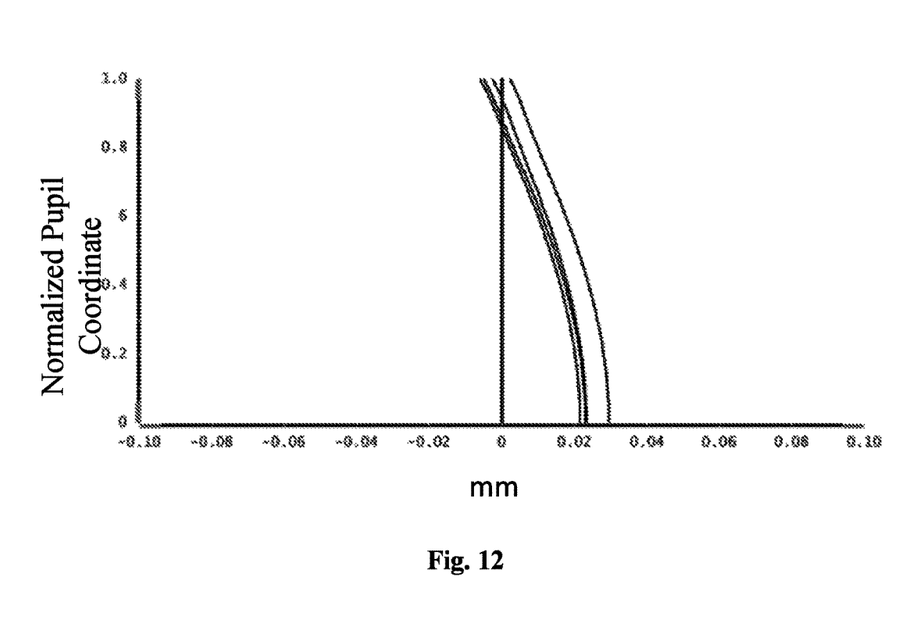
FIG. 12 illustrates an axial aberration diagram of the optical imaging lens in the third embodiment of the invention.

In this embodiment, a distortion, a field curvature, and an axial aberration curve thereof are shown in FIGS. 10, 11 and 12, respectively. As can be seen from FIGS. 10, 11 and 12, the distortion, the field curvature, and the axial aberration can be well corrected in this embodiment.

Fourth Embodiment

Figure 13:
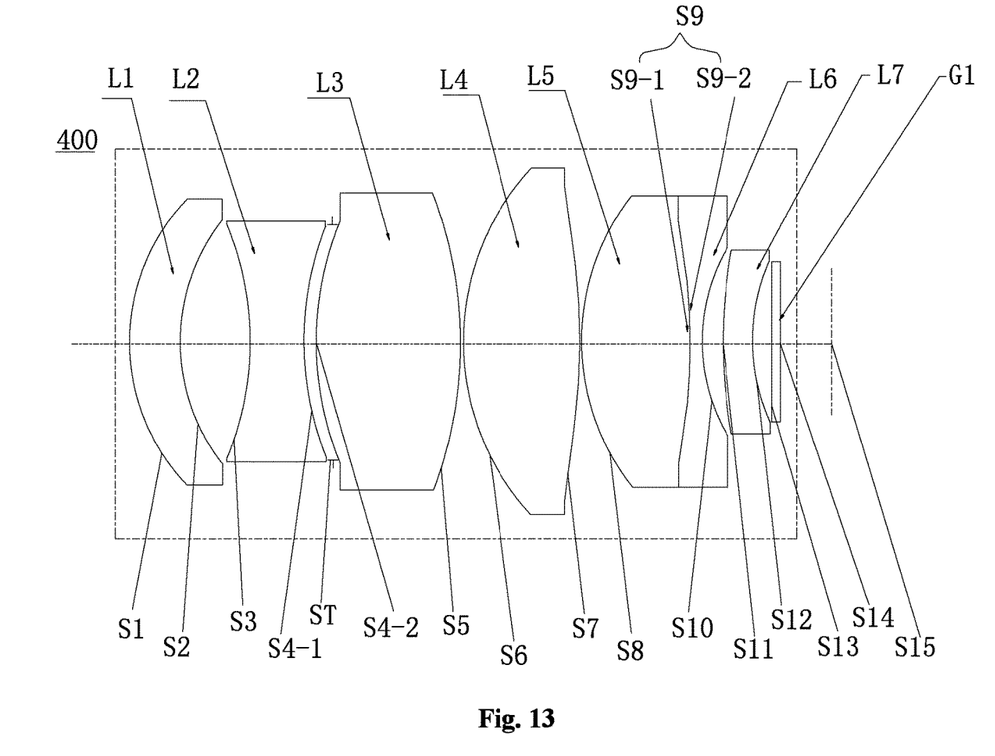
FIG. 13 illustrates a schematic diagram of a structure of an optical imaging lens in a fourth embodiment of the invention.

Referring to FIG. 13 for a schematic diagram of a structure of an optical imaging lens 400 provided in this embodiment of the invention, the structure of the optical imaging lens 400 in this embodiment is substantially the same as that of the optical imaging lens 100 in the first embodiment, and the differences therebetween lie in the first lens L1 having positive focal power, the second lens L2 and the third lens L3 being independent lenses (both not formed into a cemented body), the diaphragm ST disposed between the second lens L2 and the third lens L3, and the radius of curvature and selected material of the lens.

The relevant parameters of each lens of the optical imaging lens 400 provided in this embodiment are shown in Table 7.

TABLE 7

| Surf. No. | Surf. Type | RoC (mm) | Thickness (mm) | Nd | Vd |
|---|---|---|---|---|---|
| Object surface | plane | Infinity | Infinity | | |
| S1 | L1 aspherical | 13.723 | 3.213 | 1.81 | 40.9 |
| S2 | aspherical | 14.369 | 4.387 | | |
| S3 | L2 spherical | −18.529 | 3.454 | 1.58 | 41.5 |
| S4-1 | spherical | 19.063 | 1.575 | | |
| ST | Diaphragm plane | Infinity | −1.328 | | |
| S4-2 | L3 spherical | 18.595 | 9.155 | 1.50 | 81.6 |
| S5 | spherical | −25.558 | 0.150 | | |
| S6 | L4 aspherical | 14.831 | 7.392 | 1.50 | 81.6 |
| S7 | aspherical | −41.784 | 0.150 | | |
| S8 | L5 spherical | 14.241 | 6.812 | 1.9 | 37.1 |
| S9 | L6 spherical | −41.874 | 0.799 | 1.85 | 23.8 |
| S10 | spherical | 10.840 | 1.309 | | |
| S11 | L7 aspherical | 20.755 | 1.978 | 1.82 | 24 |
| S12 | aspherical | 14.545 | 1.131 | | |
| S13 | G1 plane | Infinity | 0.500 | 1.52 | 64.2 |
| S14 | plane | Infinity | 3.337 | | |
| S15 | IS plane | Infinity | | | |

The parameters of each aspherical lens in this embodiment are shown in Table 8.

TABLE 8

| Surf. No. | K | B | C | D | E | F |
|---|---|---|---|---|---|---|
| S1 | 0.127 | 3.50E−05 | 1.59E−07 | 1.49E−09 | 1.29E−11 | 0 |
| S2 | 1.250 | 4.32E−05 | 1.04E−07 | 4.99E−09 | 6.98E−12 | 0 |
| S6 | −0.146 | −2.72E−06 | −4.02E−08 | 2.10E−10 | −6.36E−13 | 4.88E−14 |
| S7 | −11.795 | −7.17E−06 | 2.26E−08 | 9.98E−10 | 2.83E−12 | 3.49E−14 |
| S11 | 2.517 | −0.00019 | −5.54E−06 | 9.63E−08 | −9.39E−10 | 3.57E−12 |
| S12 | −0.040 | 0.000218 | −1.63E−06 | 3.01E−07 | −3.72E−09 | 1.31E−10 |

Figure 14:
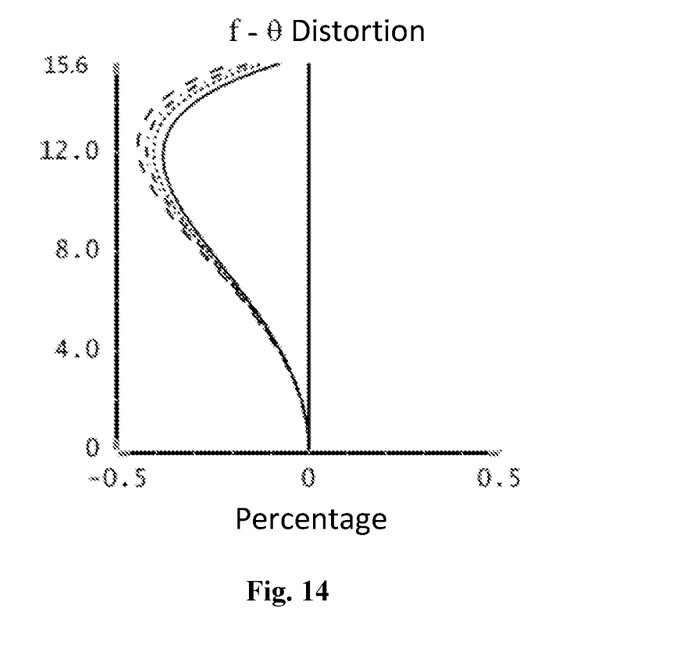
FIG. 14 illustrates a distortion curve diagram of the optical imaging lens in the fourth embodiment of the invention.
Figure 15:
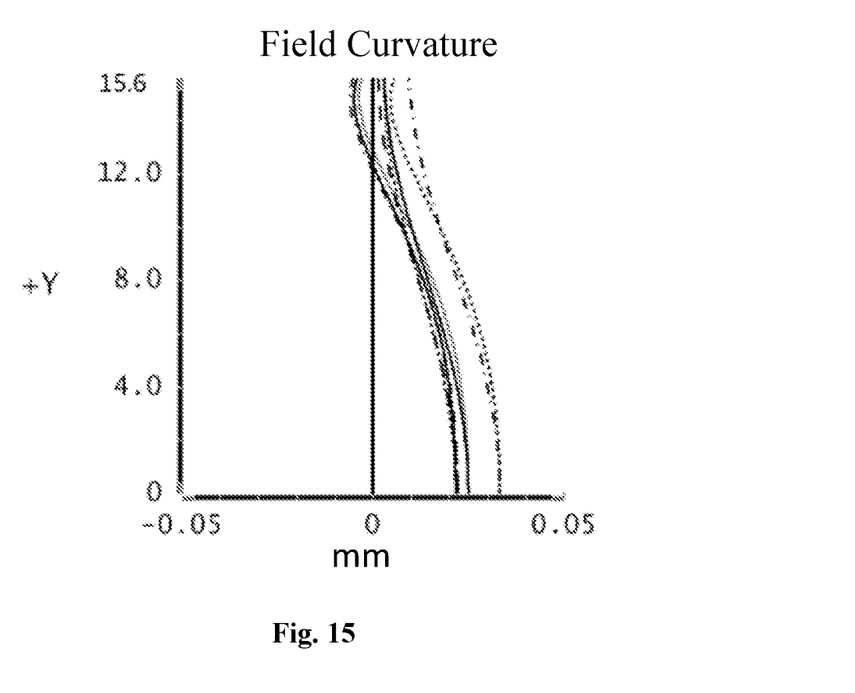
FIG. 15 illustrates a field curvature curve diagram of the optical imaging lens in the fourth embodiment of the invention.
Figure 16:
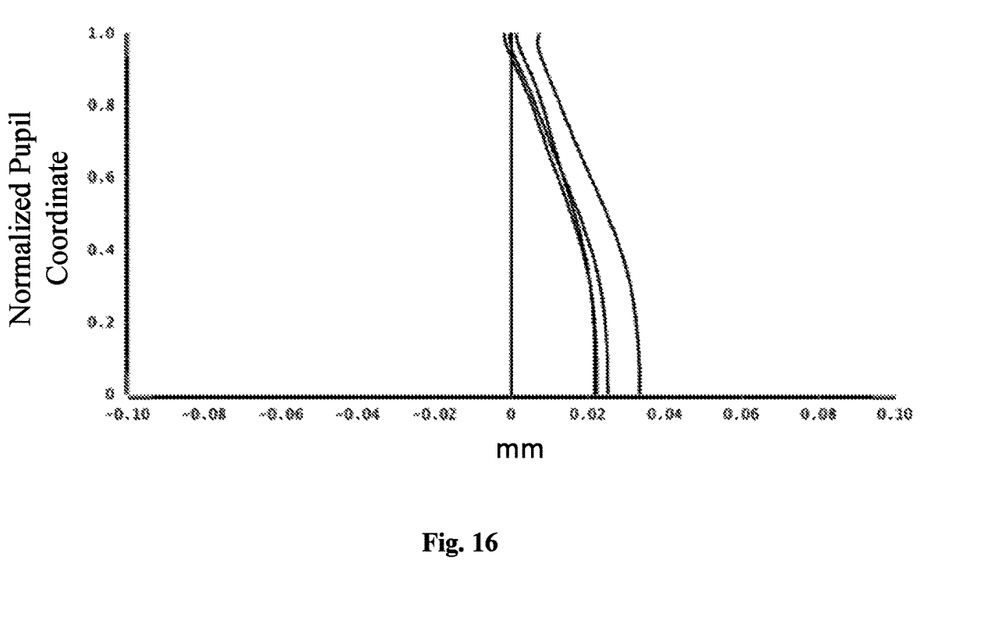
FIG. 16 illustrates an axial aberration diagram of the optical imaging lens in the fourth embodiment of the invention.

In this embodiment, a distortion, a field curvature, and an axial aberration curve thereof are shown in FIGS. 14, 15 and 16, respectively. As can be seen from FIGS. 14, 15 and 16, the distortion, the field curvature, and the axial aberration can be well corrected in this embodiment.

Table 9 exhibits the above four embodiments and their corresponding optical characteristics, mainly including a focal length f, aperture number F#, field of view FOV and total optical length TTL of each system, as well as the values corresponding to each of the conditions as mentioned above.

TABLE 9

| Condition | First Embodiment | Second Embodiment | Third Embodiment | Fourth Embodiment |
|---|---|---|---|---|
| f(mm) | 16.2 | 16.18 | 16.24 | 16.23 |
| TTL (mm) | 44.32 | 44.31 | 44.01 | 44.01 |
| F# | 1.1 | 1.0 | 1.2 | 1.1 |
| FOV | 31.2° | 28° | 31.2° | 31.2° |
| F#/f | 0.068 | 0.062 | 0.075 | 0.068 |
| f*tanθ/$Y_θ$ | 1.0023 | 1.0016 | 1.0034 | 1.0018 |
| TTL/f | 2.735 | 2.74 | 2.71 | 2.71 |
| f/f1 | −0.052 | 0.01 | 0.14 | 0.14 |
| R12/R11 | 0.85 | 0.93 | 1.33 | 1.05 |
| f2/f3 | −0.76 | −1.07 | −0.72 | −1.42 |
| f5/f6 | −0.97 | −0.94 | −1.386 | −1.23 |
| f4/f | 1.37 | 2.13 | 1.48 | 1.41 |
| f/f7 | −0.365 | −0.312 | −0.142 | −0.237 |
| R72/R71 | 0.63 | 0.65 | 0.82 | 0.7 |
| Nd1 | 1.81 | 1.81 | 1.81 | 1.81 |
| Nd7 | 1.81 | 1.81 | 1.82 | 1.82 |

In conclusion, the optical imaging lenses provided by the embodiments of the invention have at least the following advantages:

(1) As can be seen from the structural diagrams of the optical imaging lenses of FIGS. 1, 5, 9 and 13 corresponding to the above four embodiments, the optical imaging lenses provided by the embodiments of the invention have a compact structure and a smaller gap between the lenses, indicating that the overall dimension of each optical imaging lens is well constrained;

(2) As can be seen from the distortion curves of FIGS. 2, 6, 10 and 14 corresponding to the above four embodiments, the distortion of each optical imaging lens provided by the invention is very small, falling within a range of ±0.5%, and has larger focal length;

(3) As can be seen from the field curvature curve diagrams of FIGS. 3, 7, 11 and 15 corresponding to the above four embodiments, and the axial aberration curves of FIGS. 4, 8, 12 and 16, the field curvature and aberration of each optical imaging lens provided by the invention are well corrected to ensure the high-resolution characteristic of the optical imaging lens. The aperture number F# in the above four embodiments is less than or equal to 1.2, which reflects that the optical imaging lenses provided by the invention have the characteristic of super large aperture. The smaller the aperture number F#, the greater the light input of the optical imaging lens.

(4) All lenses are made of a glass material with good reliability, which can meet the harsh working environment in the on-board field;

(5) Through a reasonable collocation of multiple glass spherical and aspheric lenses, as well as a reasonable collocation of focal powers, the resolution of the lens is greatly improved, so that it can match an imaging chip having 8 M pixel specification and large target surface to meet the urgent needs of the market for an on-board high-pixel lens;

(6) Due to a reasonable arrangement of the shape and focal power of each lens behind the diaphragm and the fact that the diaphragm is arranged near the front end, the optical imaging lenses have high-definition imaging quality in addition to super large aperture; Since the aperture is below 1.2, the luminous flux is increased by 2-4 times, so that an on-board optical lens has good imaging effect even in dark environment and reduces the potential safety hazards of driving;

(7) The optical imaging lenses of the invention have long focal length and good imaging effect on remote objects, so that the advantage of good imaging effect on remote objects can provide more response time for a vehicle system to avoid obstacles when the vehicle is travelling at a high speed.

Fifth Embodiment

Figure 17:
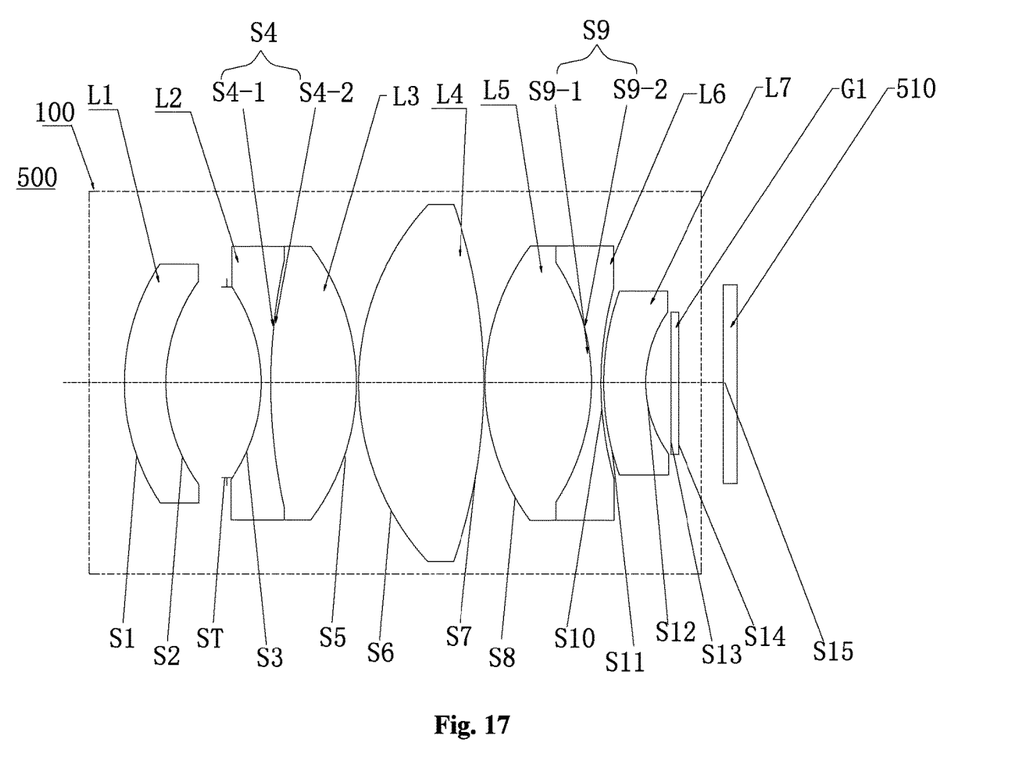
FIG. 17 is a schematic diagram of a structure of imaging equipment provided in a fifth embodiment of the invention.

Referring to FIG. 17 for a schematic diagram of a structure of an imaging equipment 500 provided by this embodiment, the imaging equipment 500 comprises an optical imaging lens in any one of the above embodiments (e.g., the optical imaging lens 100) and an imaging device 510. The imaging device 510 may be a CMOS (Complementary Metal Oxide Semiconductor) image sensor, or a CCD (Charge Coupled Device) image sensor.

The imaging equipment 500 may be a motion camera, a panoramic camera, an on-board camera, and any other forms of electronic device equipped with the optical imaging lens.

The imaging equipment 500 provided in this embodiment comprises the optical imaging lens 100. Because the optical imaging lens has the advantages such as small volume, super large aperture, long focal length and high resolution, the imaging equipment 500 gains the advantages of small volume, super large aperture, long focal length and high resolution.

The embodiments recited above only depict several embodiments of the invention. Although the description of them is relatively specific and detailed, they cannot be accordingly understood as limitations of the scope of this patent for invention. It should be pointed out that for those skilled in the art, several modifications and improvements may be further made without departing from the concept of the invention, which all fall into the scope of protection of the invention. Therefore, the scope of protection of this patent for the invention should be subject to the appended claims.

We claim:

1. An optical imaging lens, sequentially comprising, from an object side to an image side:
a first lens with focal power, having an object side surface being a convex surface and an image side surface being a concave surface;
a second lens with negative focal power, having an object side surface being a concave surface and an image side surface being a concave surface;
a third lens with positive focal power, having an object side surface being a convex surface and an image side surface being a convex surface;
a fourth lens with positive focal power, having an object side surface being a convex surface and an image side surface being a convex surface;
a fifth lens with positive focal power, having an object side surface being a convex surface and an image side surface being a convex surface;
a sixth lens with negative focal power, having an object side surface being a concave surface and an image side surface being a concave surface, and the fifth lens and the sixth lens formed into a cemented body;
a seventh lens with negative focal power, having an object side surface being a convex surface and an image side surface being a concave surface; and
a diaphragm, disposed between the first lens and the third lens.

2. The optical imaging lens according to claim 1, wherein the second lens and the third lens are formed into a cemented body.

3. The optical imaging lens according to claim 1, wherein the second lens, the third lens, the fifth lens and the sixth lens are spherical lenses, and the fourth lens and the seventh lens are aspherical lenses.

4. The optical imaging lens according to claim 1, wherein the optical imaging lens satisfies a condition as below:

$$F\#/f<0.1;$$

where F# represents an aperture value of the optical imaging lens, and f represents a focal length of the optical imaging lens.

5. The optical imaging lens according to claim 1, wherein the optical imaging lens satisfies a condition as below:

$$0.99<(f^*\tan\theta)/Y_\theta<1.01;$$

where f represents a focal length of the optical imaging lens, θ represents an angle of half field of view of the optical imaging lens, $Y_\theta$ represents an image height value corresponding to the angle of half field of view of the optical imaging lens.

6. The optical imaging lens according to claim 1, wherein the optical imaging lens satisfies a condition as below:

$$TTL/f<4;$$

where TTL represents a total optical length of the optical imaging lens, and f represents a focal length of the optical imaging lens.

7. The optical imaging lens according to claim 1, wherein the optical imaging lens satisfies a condition as below:

$$20°<FOV<40°;$$

where FOV represents the maximum angle of field of view of the optical imaging lens.

8. The optical imaging lens according to claim 1, wherein the optical imaging lens satisfies conditions as below:

$$-0.3<f/f1<0.3;$$

$$0.5<R12/R11<1.5;$$

where R11 represents a radius of curvature of the object side surface of the first lens, R12 represents a radius of curvature of the image side surface of the first lens, f represents a focal length of the optical imaging lens, and f1 represents a focal length of the first lens.

9. The optical imaging lens according to claim 1, wherein the optical imaging lens satisfies conditions as below:

$$-2<f2/f3<-0.5;$$

$$-2<f5/f6<-0.5;$$

where f2 represents a focal length of the second lens, f3 represents a focal length of the third lens, f5 represents a focal length of the fifth lens, and f6 represents a focal length of the sixth lens.

10. The optical imaging lens according to claim 1, wherein the optical imaging lens satisfies a condition as below:

$1<f4/f<3$;

where f4 represents a focal length of the fourth lens, and f represents a focal length of the optical imaging lens.

11. The optical imaging lens according to claim 1, wherein the optical imaging lens satisfies conditions as below:

$-0.6<f/f7<0$;

$0.5<R72/R71<1$;

where R71 represents a radius of curvature of the object side surface of the seventh lens, R72 represents a radius of curvature of the image side surface of the seventh lens, f represents a focal length of the optical imaging lens, and f7 represents a focal length of the seventh lens.

12. The optical imaging lens according to claim 1, wherein the optical imaging lens satisfies a condition as below:

$Nd1>1.8, Nd7>1.8$;

where Nd1 represents a refractive index of the first lens, and Nd7 represents a refractive index of the seventh lens.

13. The optical imaging lens according to claim 1, wherein the aperture value F# of the optical imaging lens satisfies $F\#\leq 1.2$.

14. The optical imaging lens according to claim 1, wherein the first lens, the second lens, the third lens, the fourth lens, the fifth lens, the sixth lens and the seventh lens are glass lenses.

15. An optical imaging lens, sequentially comprising, from an object side to an image side:
  a first lens with positive focal power, having an object side surface being a convex surface and an image side surface being a concave surface;
  a second lens with negative focal power, having an object side surface being a concave surface and an image side surface being a concave surface;
  a third lens with positive focal power, having an object side surface being a convex surface and an image side surface being a convex surface;
  a fourth lens with positive focal power, having an object side surface being a convex surface and an image side surface being a convex surface;
  a fifth lens with positive focal power, having an object side surface being a convex surface and an image side surface being a convex surface;
  a sixth lens with negative focal power, having an object side surface being a concave surface and an image side surface being a concave surface, and the fifth lens and the sixth lens formed into a cemented body;
  a seventh lens with negative focal power, having an object side surface being a convex surface and an image side surface being a concave surface; and
  a diaphragm, disposed between the first lens and the third lens.

16. The optical imaging lens according to claim 15, wherein the optical imaging lens satisfies a condition as below:

$F\#/f<0.1$;

where F# represents an aperture value of the optical imaging lens, and f represents a focal length of the optical imaging lens.

17. The optical imaging lens according to claim 15, wherein the optical imaging lens satisfies conditions as below:

$-0.3<f/f1<0.3$;

$0.5<R12/R11<1.5$;

where R11 represents a radius of curvature of the object side surface of the first lens, R12 represents a radius of curvature of the image side surface of the first lens, f represents a focal length of the optical imaging lens, and f1 represents a focal length of the first lens.

18. The optical imaging lens according to claim 1, wherein the optical imaging lens satisfies conditions as below:

$-2<f2/f3<-0.5$;

$-2<f5/f6<-0.5$;

where f2 represents a focal length of the second lens, f3 represents a focal length of the third lens, f5 represents a focal length of the fifth lens, and f6 represents a focal length of the sixth lens.

19. An imaging equipment, comprising:
  an optical imaging lens, sequentially comprising, from an object side to an image side:
    a first lens with focal power, having an object side surface being a convex surface and an image side surface being a concave surface;
    a second lens with negative focal power, having an object side surface being a concave surface and an image side surface being a concave surface;
    a third lens with positive focal power, having an object side surface being a convex surface and an image side surface being a convex surface;
    a fourth lens with positive focal power, having an object side surface being a convex surface and an image side surface being a convex surface;
    a fifth lens with positive focal power, having an object side surface being a convex surface and an image side surface being a convex surface;
    a sixth lens with negative focal power, having an object side surface being a concave surface and an image side surface being a concave surface, and the fifth lens and the sixth lens formed into a cemented body;
    a seventh lens with negative focal power, having an object side surface being a convex surface and an image side surface being a concave surface; and
    a diaphragm, disposed between the first lens and the third lens, and
  an imaging device for converting an optical image formed by the optical imaging lens into an electrical signal.

20. The imaging equipment according to claim 19, wherein the first lens, the second lens, the third lens, the fourth lens, the fifth lens, the sixth lens and the seventh lens are glass lenses.

* * * * *